United States Patent
Mayer (10) Patent No.: US 9,580,240 B2
(45) Date of Patent: Feb. 28, 2017

(54) DRIP LINER FOR HAZARDOUS MATERIALS

(71) Applicants: PERFORMANCE PETROLEUM, Long Lake, MN (US); Jon G. Mayer, Wayzata, MN (US)

(72) Inventor: Jon G. Mayer, Wayzata, MN (US)

( * ) Notice: Subject to any disclaimer, the term of this patent is extended or adjusted under 35 U.S.C. 154(b) by 0 days.

(21) Appl. No.: 14/776,085

(22) PCT Filed: Mar. 13, 2014

(86) PCT No.: PCT/US2014/025978
§ 371 (c)(1),
(2) Date: Sep. 14, 2015

(87) PCT Pub. No.: WO2014/160176
PCT Pub. Date: Oct. 2, 2014

(65) Prior Publication Data
US 2016/0031639 A1    Feb. 4, 2016

Related U.S. Application Data (60) Provisional application No. 61/781,804, filed on Mar. 14, 2013.

(51) Int. Cl.
| | | |
|---|---|---|
| *B65D 90/24* | (2006.01) | |
| *B65D 90/04* | (2006.01) | |
| *F16N 31/00* | (2006.01) | |
| *B08B 17/02* | (2006.01) | |

(52) U.S. Cl.
CPC ............ *B65D 90/24* (2013.01); *B08B 17/025* (2013.01); *B65D 90/041* (2013.01); *F16N 31/002* (2013.01)

(58) Field of Classification Search
CPC ............ B65D 21/0201; B65D 21/0202; B65D 21/0204; B65D 90/24; B65D 90/041; B08B 17/025; F16N 31/002; F16N 31/006
USPC ...... 220/23.4, 23.2, 573, 571; 446/115, 114, 446/108
See application file for complete search history.

(56) References Cited

U.S. PATENT DOCUMENTS

| | | | | |
|---|---|---|---|---|
| 2,413,183 | A * | 12/1946 | Hosbein ................ | F27D 1/004 110/336 |
| 6,290,143 | B1 * | 9/2001 | Vincent ................ | E01B 19/006 220/573 |
| 2005/0284704 | A1 * | 12/2005 | Hernandez ............ | E04H 6/428 184/106 |
| 2010/0089781 | A1 * | 4/2010 | Van Uum ............ | B65D 5/0015 206/386 |

* cited by examiner

*Primary Examiner* — Robert J Hicks
(74) *Attorney, Agent, or Firm* — Billion & Armitage; John F. Klos (57) ABSTRACT

A customizable hazardous material containment system including a plurality of rectangular fluid-capturing liners which are secured together via a plurality of overlapping side flanges which extend around the perimeter of the liners, the side-flange liner connection allowing for non-linear implementations of a hazardous material containment system. A drain port can be incorporated into the liner. The system can also be used as a secondary or tertiary hazardous material containment system.

9 Claims, 8 Drawing Sheets

DRIP LINER FOR HAZARDOUS MATERIALS

BACKGROUND OF THE INVENTION

Work sites need to be protected from hazardous waste material discharge. Cleaning up hazardous waste material is labor intensive and expensive. The current practice typically involves lining the work site area with heavy polymer material. Tarps or other temporary barriers do not provide a complete solution to capturing all hazardous waste material for proper disposal, particularly with larger equipment, such as fueling systems, portable generator sets, and the like which may cause such materials to slide around, tear or otherwise create gaps in the lining material through which hazardous materials may leak into the environment.

SUMMARY OF THE INVENTION

The invention described herein is an impermeable liner with side walls having flanges and connection mechanisms, creating a uniform, transportable and customizable system to contain hazardous material at a work site.

Federal and state agencies recommend or require that hazardous material environments have a secondary containment system to prevent hazardous materials from escaping into the environment while the hazardous material is being stored, used or collected as waste for proper disposal. The impermeable liner of this invention provides a transportable primary, secondary or even tertiary containment system that is compatible with many work environments and that is easy to install and clean. By providing an easily transportable containment system, regulatory guidelines for having backup or redundant material containment systems may be met or exceeded without much additional cost or equipment.

The liners are made in a tray-like configuration, so they can be easily stacked, stored and transported. Each liner is preferably of a size and weight that can be easily manually handled and positioned by a user. The ability to interconnect a plurality of liners enables the user to custom-fit the liners for the work environment, connecting as many liners as needed, in any orientation, to provide proper containment.

The liners allow flexibility in the size of the containment area, allowing quarantining of a worksite to isolate and contain hazardous waste materials in the area or areas needed, without contamination of the entire containment area. Traditional containment systems are not flexible in that if the hazardous waste material comes into contact with just a portion of the containment system, the entire containment system is contaminated by the hazardous waste and must be cleaned before the containment system can be used again. Using the liners of the present invention, the hazardous waste material is collected and retained in a smaller area, and only those liners with which the hazardous waste has come into contact need to be cleaned.

The liners are made of a polymer material that can be molded and is sturdy with some degree of flexibility. The liners can be easily cleaned using environmentally acceptable products and methods.

DETAILED DESCRIPTION OF THE INVENTION

Figure 1:
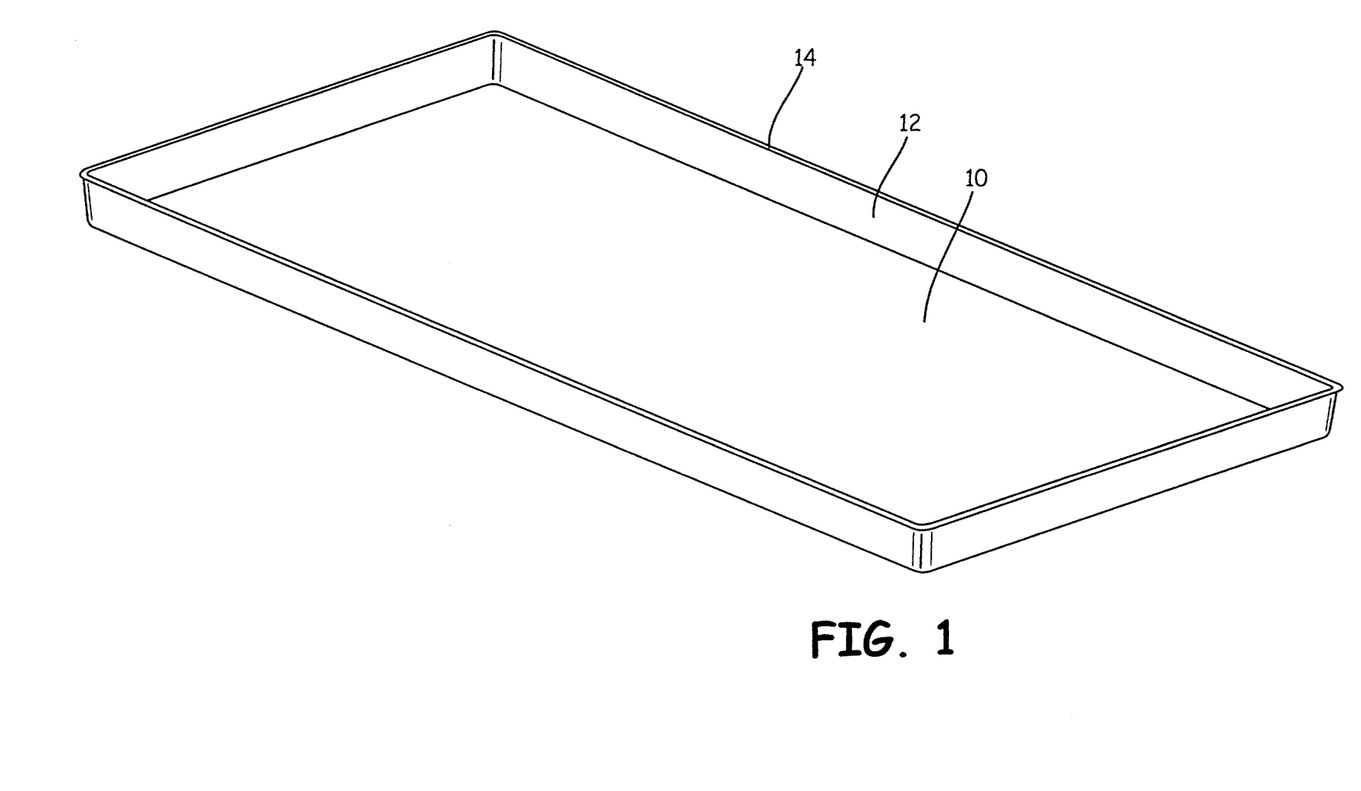
FIG. 1 is a perspective view of the liner of the invention.
Figure 1A:
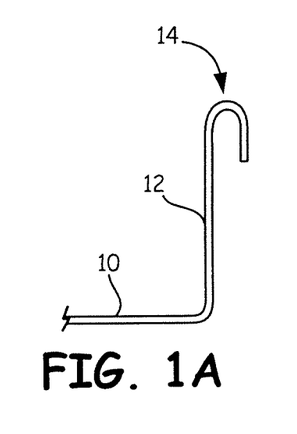
FIGS. 1a-d are cross-sectional views of various embodiments of the flange of the liner.
Figure 1B:
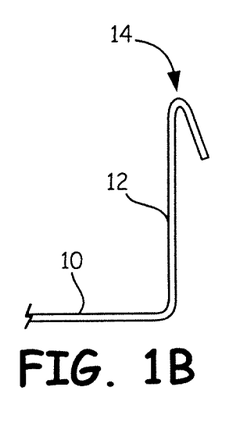
Figure 1C:
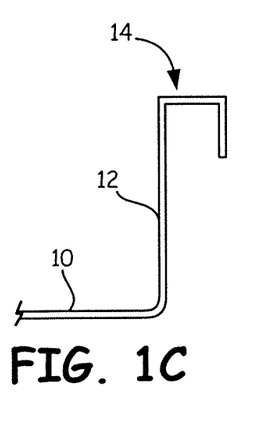
Figure 1D:
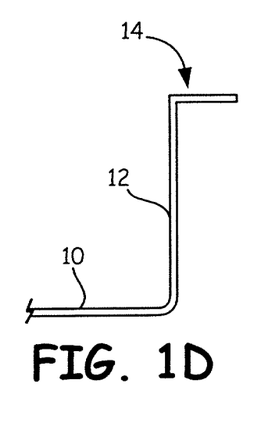

The impermeable liner includes a tray-like structure having a base 10 and an upwardly oriented sidewall 12 along the entire perimeter of the base, as shown in FIG. 1. The sidewall includes a flange 14 on the upper end of the sidewall. The cross-sectional profile of the flange 14 may be generally rounded or U-shaped, V-shaped, rectangular or flat as seen in FIGS. 1a-d. The base, sidewall and flange sections are preferably formed from a single sheet of material to form a unitary, tray-like body. Exemplary materials suitable for making the impermeable liner include high molecular weight polyethylene (HMWPE), high density polyethylene (HDPE), thermoplastic olefin (TPO), or other similar polymer materials that are impermeable and can be molded into the desired configuration. The material may be of any desired thickness or gauge depending on the intended use of the liner, typically ranging from 0.150" to 0.400". In some embodiments, materials having thicknesses of 0.187", 0.250" or 0.312" can be used.

Figure 2:
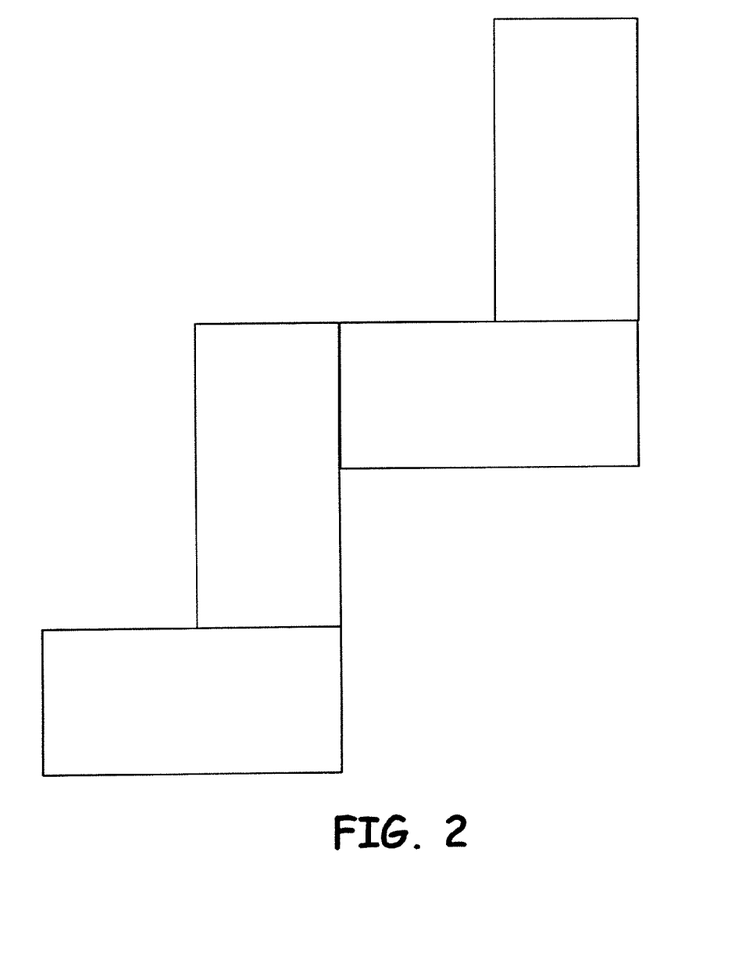
FIG. 2 is a diagram of one embodiment showing the relative orientation of a plurality of liners.
Figure 2A:
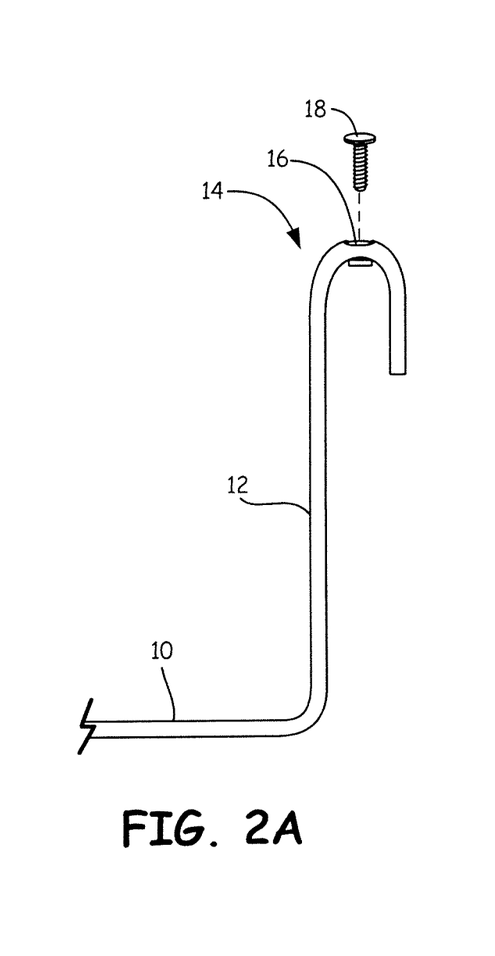
FIG. 2a is a side view of the liner flange with the connection mechanism.
Figure 4:
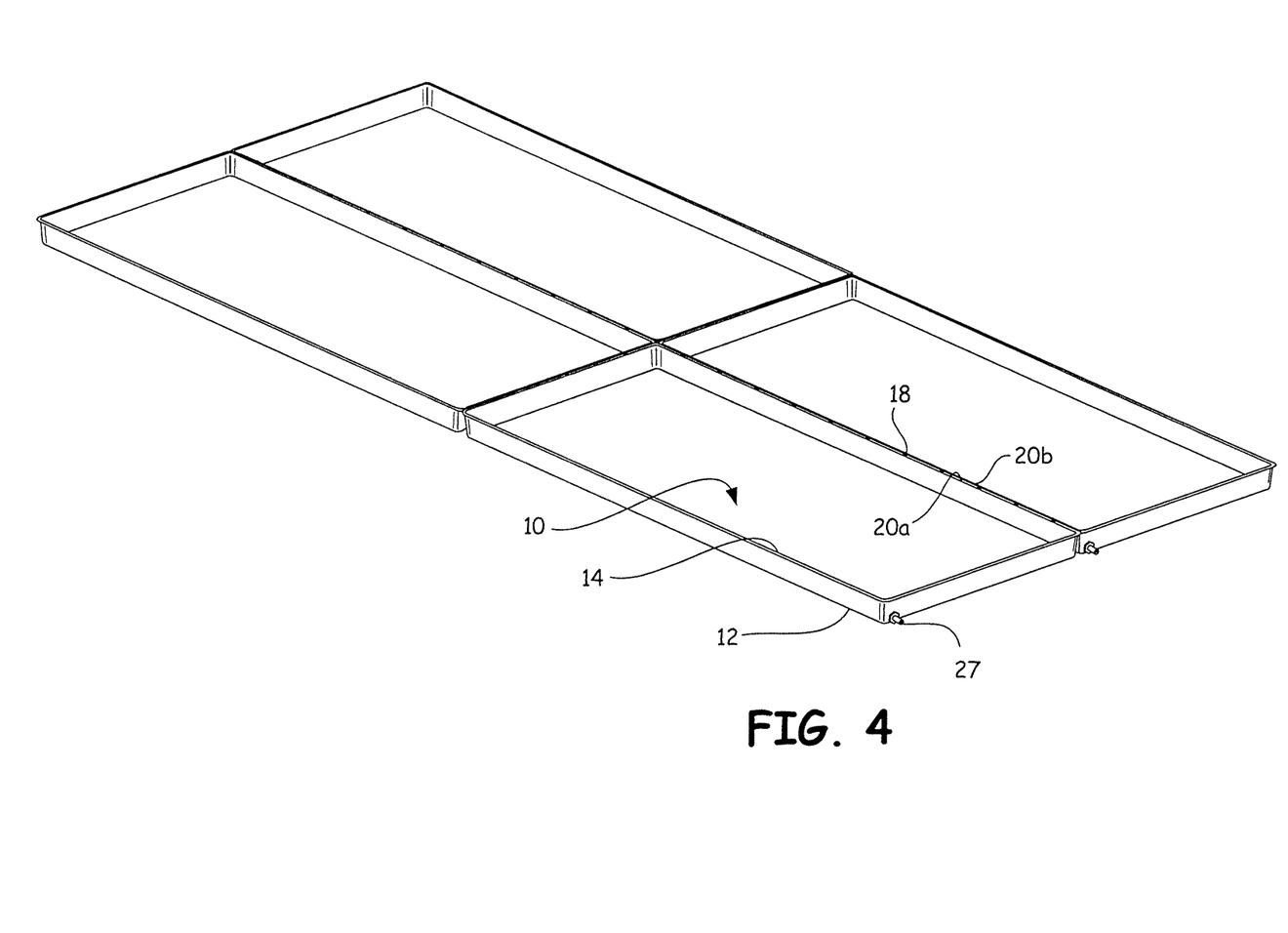
FIG. 4 is a diagram of another embodiment showing another orientation of a plurality of liners, the liners having an optional drain port.

The flange 14 includes one or more apertures 16 on the topmost surface of the flange, through which a connection mechanism 18 may be inserted, as shown in FIG. 2a. The aperture or apertures may be positioned anywhere along the perimeter of the liner to enable custom configurations to fit the intended workspace. In one embodiment, the apertures are positioned to facilitate an angular configuration as shown in FIG. 2, with the apertures shown in the flange top view of FIG. 2b. Other embodiments include a linear configuration, or an array configuration as seen in FIG. 4.

The connection mechanism 18 may include any type of system for connecting a flange from one liner to the flange from an adjacent liner. In use, the liners are placed so that the flanges are in a stacked configuration resulting in an upper flange and a lower flange, with at least one aperture in the upper flange being aligned with at least one aperture in the lower flange, as shown in FIG. 3.

Figure 3:
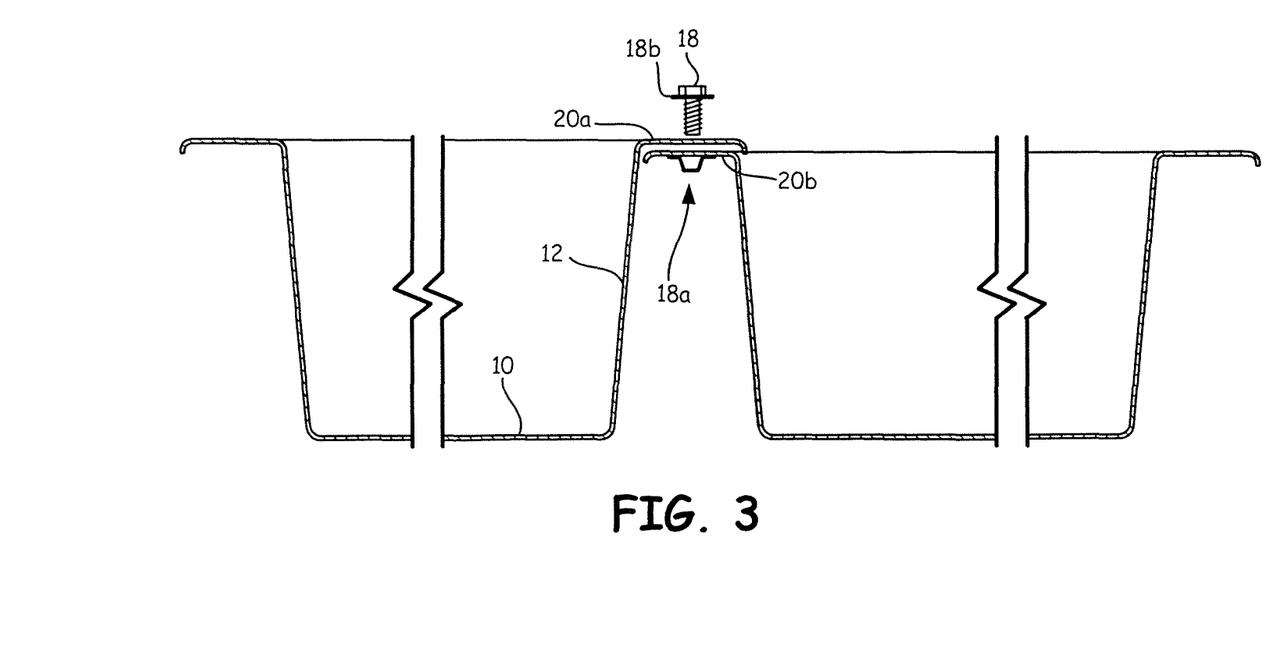
FIG. 3 is a cross-sectional view of the connection mechanism between two liners.

The connection mechanism in one embodiment includes a nut 18a and bolt 18b fastening system seen in FIG. 3, with the nut 18a positioned on the bottom surface 20b of the lower flange and aligned with the aperture, and the bolt 18b being inserted through the aperture on the upper surface 20a of the upper flange to secure the upper flange to the lower flange, thereby providing a leak-proof connection between two adjacent liners. The nut may be permanently mounted in the flange aperture, or may be inserted and fastened into the flange aperture by the user before the liners are connected by a bolt. Other connection mechanisms that provide a similar leak-proof connection between adjacent liners by using the stacked flange configuration are contemplated. The connection mechanism, such as a nut and bolt system, are preferably made of a sturdy, durable, rust-proof material such as brass, zinc, stainless steel, or other suitable materials.

Example 1

Figure 2B:
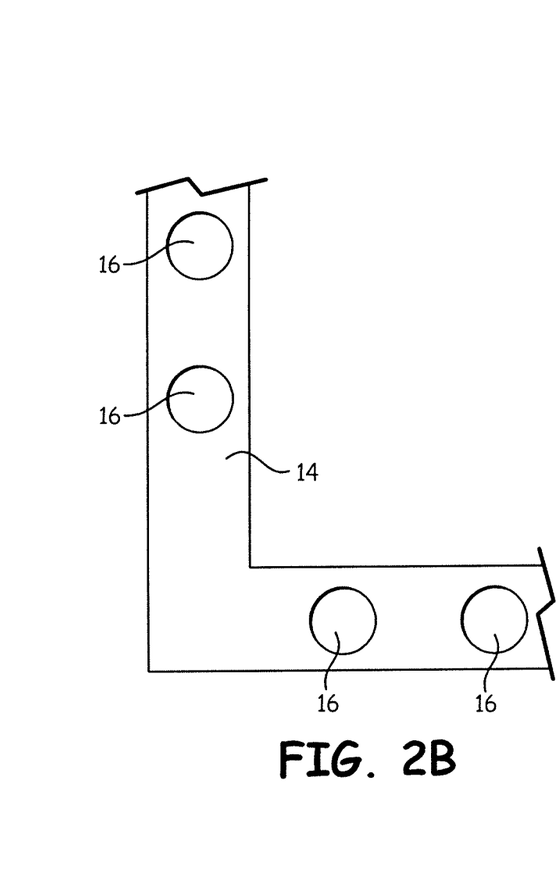
FIG. 2b is a top view of the liner flange with apertures for receiving the connection mechanism positioned to enable the orientation shown in FIG. 2.

An impermeable liner was molded from a single sheet of high molecular weight polyethylene to form a tray having dimensions of about 4 feet wide by about 8 feet long, with sidewalls having a height of about 4 inches. Apertures were made in the flange along the corners of the liner, as shown in FIG. 2b. A duplicate liner was made of the same materials and with the same dimensions.

A rev nut was installed on the bottom surface of the flange at each aperture of one of the liners, so that the opening of the nut is aligned with the aperture. The nut has internal threads into which a bolt may be securely fastened once the nut is secured to the bottom surface of the flange.

The other liner was placed adjacent to liner having the nut installed, with the other liner flange overlapping with the flange with the nut installed. A bolt was inserted through the aperture in the upper flange and was secured into the rev nut of the lower flange. The bolt can be secured manually or with a power tool. The two liners were secured together in a leak-proof configuration. The liquid volume of each liner was 78 gallons, for a total liquid containment volume of 156 gallons. The weight of each liner was about 34 pounds, making each liner very portable.

Example 2

Optional Draining System

Figure 5:
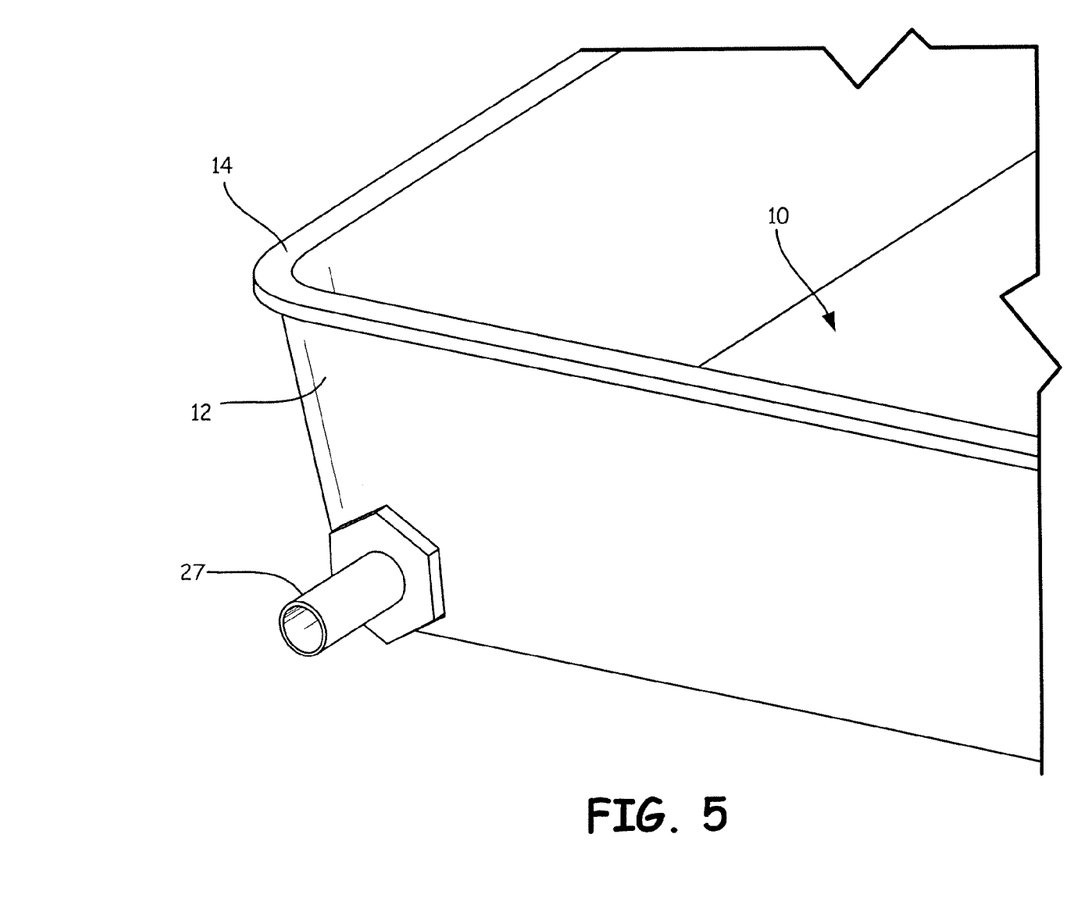
FIG. 5 shows one embodiment of a liner with a drain port.
Figure 6:
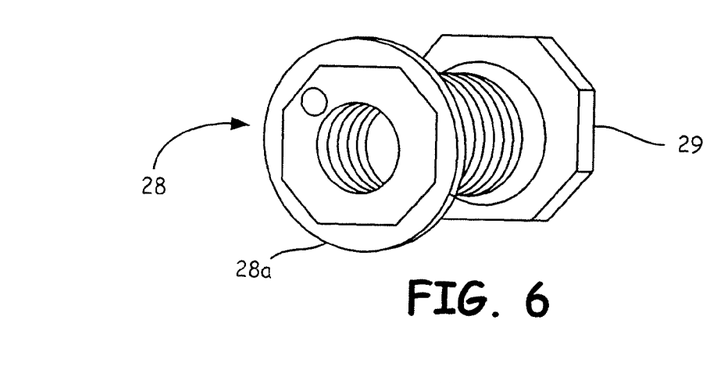
FIG. 6 shows one embodiment of a bolt with a drain.
Figure 6A:
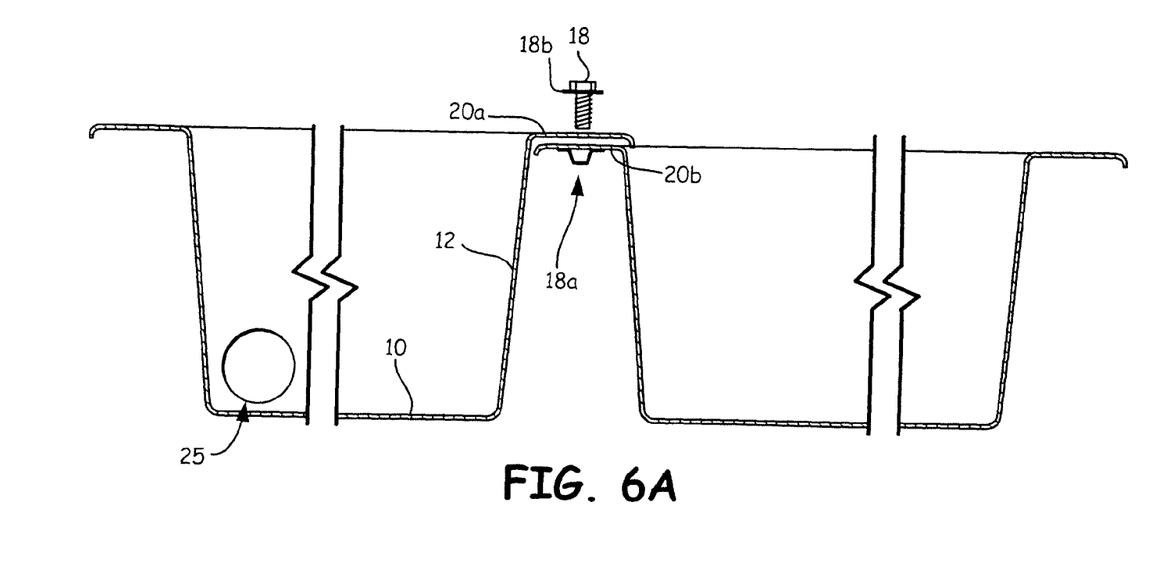
FIG. 6a is a cross-sectional view of the connection mechanism between two liners with at least one liner having a drain port.

In another embodiment, the tray includes an optional draining system in which the liner has a drain port in the sidewall, as shown in FIG. 5, into which a drain fixture 27 may be installed. The drain port 25 is preferably positioned on the sidewall at a height between the base and flange of the liner, such as at the midpoint between the base and flange, or near the base of the liner as seen in the embodiment shown in FIG. 5. One end of the drain fixture 27 can be attached to the drain port 25, and the other end of the fixture may be connected in fluid communication with a similar drain fixture in an adjacent liner. The connection may be made through a tube, such as a polypropylene or polyethylene tubing material, or any other suitable material. One embodiment of a drain fixture 27 is shown in detail in FIG. 6, in which the fixture includes a bolt 28 with a drain, and a gasket 28a, which are secured to the liner with a jam nut 29. Other embodiments in which the drain fixture is installed in drain port 25 in a leak-proof manner are contemplated by this invention, such as shown in FIG. 6a. The draining system is designed to contain the flow from the first liner by capturing it in the second liner, again providing leak-proof containment of materials and avoiding overflow over the sidewall of the liner. If the drain system will not be used, the drain port may be plugged with a plug positioned in a sealing engagement with the sidewall to allow the use of a single liner. The drain system also facilitates easily cleaning and draining the liner after hazardous materials have been contained and properly disposed.

Although the foregoing embodiments and description provide enabling details of the liner of the present invention, they are not intended to narrow the scope of the invention, which is set forth in the following claims.

What is claimed is:

1. A hazardous fluid material containment system comprising:
   a plurality of rectangular liners each having a length greatly exceeding a width and extending in a direction, with each liner comprising a base, sidewall and four flanges extending around a perimeter of the liner, and at least one aperture on a top surface of each of the four flanges, and wherein the plurality of liners are arranged in a non-linear manner with overlapping side flanges and with one of the plurality of liners extending in a first direction and an adjacent one of the plurality of liners extending in a second direction which is generally perpendicular to the first direction, and wherein for any given three liners, connections between the three liners are made along an adjacent pair of sides of a central liner.

2. The hazardous fluid material containment system of claim 1, wherein a nut is secured in the aperture.

3. The hazardous fluid material containment system of claim 1, further comprising a drain port.

4. The hazardous material containment system of claim 1, wherein a first liner having a first flange is positioned adjacent to a second liner having a second flange, said first flange being positioned in an overlapping configuration over the second flange such that the apertures in the first and second flanges are in alignment.

5. The hazardous material containment system of claim 4, wherein a nut is secured in the aperture of the second flange, and the first flange is secured to the second flange using a bolt inserted through the aperture of the first flange.

6. A method for containing materials using the hazardous material containment system of claim 4.

7. The hazardous material containment system of claim 1, wherein the material containment system is a primary hazardous material containment system.

8. The hazardous material containment system of claim 1, wherein the material containment system is a secondary hazardous material containment system.

9. The hazardous material containment system of claim 1, wherein the material containment system is a tertiary hazardous material containment system.

* * * * *